(12) United States Patent
Laperi et al.

(10) Patent No.: US 11,194,869 B2
(45) Date of Patent: *Dec. 7, 2021

(54) METHOD AND APPARATUS FOR ENRICHING METADATA VIA A NETWORK

(71) Applicant: AT&T Intellectual Property I, L.P., Atlanta, GA (US)

(72) Inventors: Erian Laperi, Frisco, TX (US); Jeremy A. Dilks, Plano, TX (US); Howard Paul Katseff, Sleepy Hollow, NY (US); Divesh Srivastava, Summit, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 212 days.

This patent is subject to a terminal disclaimer.

(21) Appl. No.: 16/538,512

(22) Filed: Aug. 12, 2019

(65) Prior Publication Data

US 2019/0370297 A1 Dec. 5, 2019

Related U.S. Application Data

(63) Continuation of application No. 15/168,774, filed on May 31, 2016, now Pat. No. 10,380,200.

(51) Int. Cl.
*G06F 16/951* (2019.01)
*G06F 16/93* (2019.01)

(52) U.S. Cl.
CPC ............ *G06F 16/951* (2019.01); *G06F 16/94* (2019.01)

(58) Field of Classification Search
None
See application file for complete search history.

(56) References Cited

U.S. PATENT DOCUMENTS

| | | | |
|---|---|---|---|
| 7,392,477 B2 | 6/2008 | Plastina | |
| 7,797,380 B2 | 9/2010 | Morioka | |
| 8,301,621 B2 | 10/2012 | Stephens | |
| 8,832,023 B2* | 9/2014 | Blomstedt | G06F 16/40 707/610 |
| 8,972,412 B1 | 3/2015 | Christian et al. | |
| 9,009,136 B2 | 4/2015 | Abajian | |
| 9,208,230 B2 | 12/2015 | Cohen et al. | |
| 9,223,870 B2 | 12/2015 | Salvetti et al. | |
| 9,244,900 B2 | 1/2016 | Kleinschmidt et al. | |
| 9,298,816 B2 | 3/2016 | Dimassimo et al. | |
| 9,680,910 B2 | 6/2017 | Chakra | |
| 2008/0301691 A1 | 12/2008 | Mamagkakis | |
| 2011/0055299 A1 | 3/2011 | Phillips | |
| 2011/0197186 A1 | 8/2011 | Barker | |

(Continued)

*Primary Examiner* — Uyen T Le

(57) ABSTRACT

A method and apparatus for enriching metadata are disclosed. For example, the method implemented via a processor monitors metadata associated with a first webpage of a plurality of webpages, the first webpage having been determined to be similar to a second webpage of the plurality of webpages, detects a change to the metadata associated with the first webpage, determines whether the change to the metadata associated with the first webpage invokes an update to a metadata associated with the second webpage, and processes the update of the metadata associated with the second webpage when the change invokes the update to the metadata associated with the second webpage.

20 Claims, 4 Drawing Sheets

(56) References Cited

U.S. PATENT DOCUMENTS

| | | |
|---|---|---|
| 2011/0246912 A1* | 10/2011 | Wiemann .............. G06F 16/972 715/760 |
| 2012/0016863 A1 | 1/2012 | Bernhardt et al. |
| 2012/0041939 A1 | 2/2012 | Amsterdamski |
| 2015/0213021 A1 | 7/2015 | He et al. |
| 2015/0254350 A1 | 9/2015 | Lightner et al. |
| 2016/0057195 A1 | 2/2016 | Jaskiewicz |
| 2016/0092474 A1 | 3/2016 | Stojanovic et al. |
| 2016/0092533 A1 | 3/2016 | Shank |

* cited by examiner

METHOD AND APPARATUS FOR ENRICHING METADATA VIA A NETWORK

This application is a continuation of U.S. patent application Ser. No. 15/168,774, filed May 31, 2016, now U.S. Pat. No. 10,380,200, which is herein incorporated by reference in its entirety.

The present disclosure relates to a method and apparatus for enriching metadata via a communications network, e.g., a communications network of a network service provider.

BACKGROUND

As the Internet continues to grow, more and more entities are conducting business by communicating with other entities over a network, e.g., a service provider network or the Internet. Business applications, e.g., supply chain management applications, have been catalysts for sharing data flows among various entities. In addition, each entity may build a website comprising any number of webpages based on data available on one or more servers of the entity. However, the entity is not in control of data on servers of other entities. Thus, irrespective of the shared nature or relatedness of the data flows, a webpage associated with a website of a first entity may be built and updated independent of any updates to a webpage associated with a website of a second entity. For example, the update may encompass modifying content on the webpage and/or metadata associated with the webpage. The metadata may provide information descriptive of the data, e.g., how to make use of the data that is published on the webpage and the like.

SUMMARY OF THE DISCLOSURE

In one embodiment, the present disclosure teaches a method and apparatus for enriching metadata via a communications network. For example, the method implemented via a processor monitors metadata associated with a first webpage of a plurality of webpages, the first webpage having been determined to be similar to a second webpage of the plurality of webpages, detects a change to the metadata associated with the first webpage, determines whether the change to the metadata associated with the first webpage invokes an update to a metadata associated with the second webpage, and processes the update of the metadata associated with the second webpage when the change invokes the update to the metadata associated with the second webpage.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
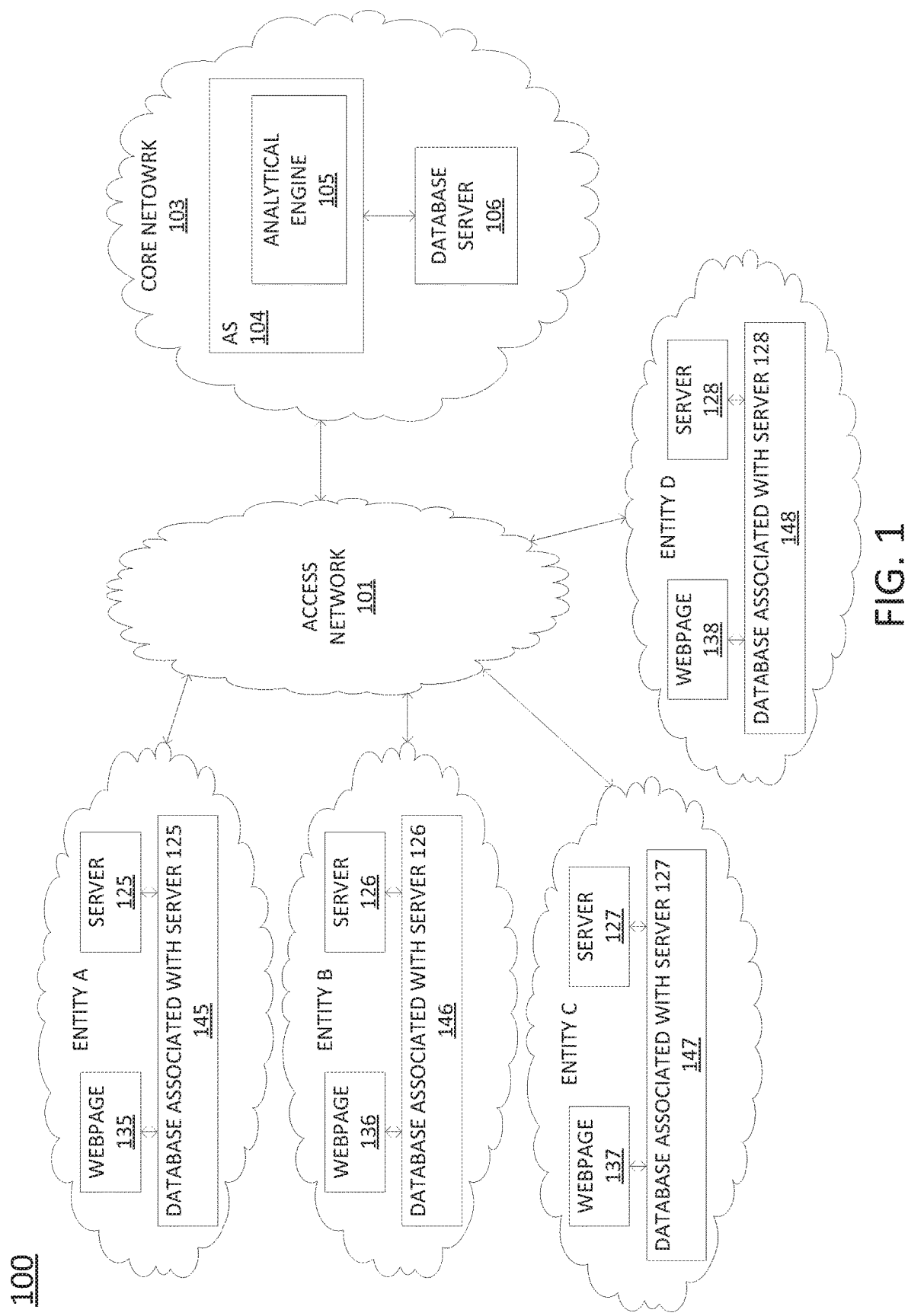
FIG. 1 illustrates an example network related to the present disclosure.

The present disclosure relates to a method and apparatus for enriching metadata via a communications network, e.g., a communications network of a network service provider. The teachings of the present disclosure may be applied via any type of wired or wireless communications network.

To better understand the current disclosure, the following terminology will first be provided:

Data;
Metadata;
Technical information;
Business information;
Quality information;
Consent information;
Textual metadata; and
Structural metadata.

Data refers to any content or information about an object. For instance, the data may be content describing an object, e.g., a person, a place, a thing, a single piece of information, a fact, etc. The data may be collected, stored in any number of databases, and analyzed to create information suitable for making decisions. For example, a server may analyze data and make a decision, e.g., a rule based decision.

Metadata refers to information that is used for describing or defining the data, e.g., allowing a user or system to understand the data and how to make use of the data. For example, metadata may provide information on: a quality of the data, a format of the data, a collection method of the data (e.g., identification of when the data was collected, identification of a source of the data, identification of an entity that collected the data, etc.), an application of the data, whether the data is to be published, whether a consent is needed for publication or usage of the data, and so on. There are many types of information that may be included in the metadata. In one example, the type of information contained in the metadata may be broadly categorized based on a type of knowledge gained for proper use of the data. For an illustrative example, the types of information included in a metadata may comprise: technical information, business information, quality information and consent information, etc.

Technical information refers to measurable and/or observable information about the data. For example, if the data comprises a list of phone call records, the technical information may comprise a list of the calls made in a predetermined time interval, and a respective call length for each call that is made. Technical information may be tabulated (e.g., in a spreadsheet).

Business information refers to information as to what the data represents and/or as to how the data is to be used. For example, suppose the data is a list of ten digit numbers. The list of ten digit numbers may represent phone numbers. In another example, suppose the data is a list of nine digit numbers. Then, the data may represent a list of social security numbers. In some scenarios the business information provides information that helps determine: whether the data is to be updated, a frequency of updating the data when the data is to be updated, etc.

Quality information refers to information about a trustworthiness or accuracy of the data. The quality information may include a rating of the quality (i.e., a rating of the trustworthiness or accuracy) of the data. For example, the rating of the quality may be provided as a quality index. The rating may be provided using a qualitative or a quantitative scale. For instance, a qualitative scale may indicate the data as being: a high quality data, a medium quality data, a low quality data, etc. If the rating of the quality of the data is quantitative, the rating may be provided on a given scale, e.g., a scale of 1-100, a scale of 1-10, etc. For example, if the content is created by any random person and has not been validated as being accurate, the data may be considered as a low quality data. If the rating of the quality is given on a scale of 1-10, the rating may be set to one to indicate that the data is of the lowest quality (i.e., least trustworthy). If the content is provided by a Subject Matter Expert (SME) for a domain, the data may be of the highest quality and the rating of the quality of the data on a scale of 1-10 may indicate a rating of ten (i.e., most trustworthy). In another example, the content may be obtained from a student paper (e.g., with limited peer or supervisory review), the rating of the quality of the data on a scale of 1-10 may be a three (3). In another example, the content may be obtained from a student paper but the student is a Ph.D. student with some previous publications on the topic (e.g., with greater peer or supervisory review). Then, the rating of the quality of the data on a scale of 1-10 may be an eight (8). In another example, the content may be from a reputable Journal with content that is reviewed by industry experts. Then, the rating of the quality of the data on a scale of 1-10 may be a ten (10).

Consent information refers to information about consent and/or permission to publish and/or use the data. For example, if the data is a list of phone numbers and the owners of the phone numbers do not consent for publication of the phone numbers, the consent information may provide information as to the fact that the phone numbers are not to be published.

As described above, the metadata may be broadly categorized based on a type of knowledge gained for proper use of the data. Regardless of the type of information (e.g., technical information, business information, quality information, consent information, etc.), the information is provided either as a textual metadata or a structural metadata, as described below. For example, the technical information, business information, quality information, consent information, etc. are provided as textual and/or structural metadata.

Textual metadata refers to metadata that may comprise descriptive text (e.g., alphanumeric characters) that may be used for locating content. For example, a textual metadata may comprise a list of words, phrases or keywords associated with the data.

Structural metadata refers to metadata that provides structural information pertaining to the data such as how data is grouped or which portion of the data is grouped. For example, a structural metadata may comprise: a list of sections and/or subsections, a list of tables, a list of attributes, etc., associated with grouping of the data.

As described above, data flow among various entities has become a necessity to conduct business in an efficient manner. In one example, an entity, e.g., an enterprise, may provide a product and/or a service. The entity may create data related to the product and/or the service. The data may need to be disseminated to one or more other entities (i.e., recipients of the data) that may need the data to sell or use the product and/or the service. Furthermore, a recipient of such data may receive such data from a very large number of sources, e.g., a retailer receiving product information from manufacturers of the products sold by the retailer, e.g., a supermarket, a department store, and the like. In yet another example, an entity may be a retailer or distributor distributing products from one or more other entities. Thus, data about a product may flow from a server of a producer of the product to a server of the retailer or a distributor. As the above examples illustrate, based on the direction of flow of the data, a particular entity may be a recipient of the data or a source of the data.

A website comprising any number of webpages may be built for each entity based on data available on one or more servers of the respective entity. A webpage associated with a website of an entity (e.g., a retailer) may be built independent of a webpage associated with a website of another entity (e.g., a manufacturer). However, a link may be placed in a webpage of an entity (e.g., a retailer) pointing to other webpages that belong to any number of other entities (e.g., manufacturers). In other words, a webpage of an entity being built independent of webpages that belong to other entities does not preclude inclusion of links, e.g., Uniform Resource Locators (URLs), pointing to the webpages of the other entities. For example, suppose a webpage is associated with a website of a retailer. Then, the webpage may be based on data contained on one or more servers of the retailer. The webpage associated with the website of the retailer is independent of content provided on webpages associated with websites that belong to entities that manufactured the products distributed through the retailer.

Similarly, each entity updates its respective webpages in accordance with the needs of the entity (i.e., the needs of the entity to which the website belongs). The update to the webpage may be for modifying a content available on the webpage and/or a metadata associated with the webpage. For example, a manufacturer of a product may update a webpage associated with its website regardless of when and how webpages associated with websites of retailers are updated. Conversely, a retailer may update webpages associated with its website regardless of when and how webpages associated with websites of manufacturers are updated.

For an illustrative example, suppose a plurality of webpages is created for presenting data about an object, e.g., a person, a thing, a place, etc. For instance, the object may be a corporation named X. Suppose each of the plurality of webpages that provides content about corporation X is built for a respective different entity. Each entity has any number of servers for storing the data. The webpage of a particular entity is based on data about corporation X that is stored on the servers of the particular entity. In addition, updating a webpage built for a particular entity does not update a webpage that is built for another entity. Thus, content about corporation X found on a webpage of one entity may be different from content about corporation X found on a webpage of another entity.

Returning to the enrichment of the metadata, as described above, it is advantageous to make the metadata as complete, accurate, and of high quality as possible. The enrichment of the metadata is for improving information described by the metadata (e.g., technical information, business information, quality information, consent information, etc.). The improvement enables users to make better and efficient use of the data. One way for improving the metadata is to have the metadata designed and modified by human stewards of the data. The human stewards of the data may validate the metadata and make necessary changes. However, as the flow of data among servers that belong to different entities continues to grow, the metadata associated with webpages of various websites may become inconsistent. An attempt to maintain consistency with human stewards validating the metadata across various websites becomes cost prohibitive, if not impossible.

In one embodiment, the method of the present disclosure describes an enrichment of metadata by a network service provider. The network service provider may provide a service to any number of entities to enrich metadata associated with their respective webpages. For example, the service may be provided on a subscription basis.

In one embodiment, the method identifies a plurality of webpages across which metadata is to be maintained. For example, the plurality of webpages that should have similar content and/or structure are identified.

In one embodiment, the operation of identifying the plurality of webpages is performed by receiving a list of the plurality of webpages from an entity that subscribes to a service for enriching metadata associated with one or more webpages. In one embodiment, the subscriber to the service is the "source" entity whose website is a source of content for enriching the metadata of webpages of other "recipient" entities. In one example, a manufacturer may be the subscriber and may subscribe to have metadata to be gathered from its webpages for enrichment of webpages of retailers of products produced by the manufacturer. For instance, if the manufacturer adds a section for describing a product, the metadata of the webpage of the manufacturer may reflect the addition of the section. In turn, the enriching of the metadata of the webpages of the retailers entails adding the same section to the metadata of the webpages of each of the retailers. In other words, the list of the plurality of webpages may comprise webpages of recipient entities, wherein the metadata being enriched is metadata associated with one or more webpages of the recipient entities (i.e., not the subscriber's own webpages).

In another embodiment, the subscriber to the service is the "recipient" entity whose website is a recipient of content for the enrichment of the metadata of the entity. In other words, a webpage of a "source" entity in the list of the plurality of webpages is the source for enrichment of the metadata of the webpage of the recipient entity that subscribes to the service. In one example, a retailer may be the subscriber and may provide to the network service provider a list of webpages of manufacturers of products that are distributed through the retailer. The metadata of the webpage of the retailer may then be enriched by retrieving content from the webpages of the manufacturers. Thus, the "subscriber" to the service may comprise the "source" entity or the "recipient" entity.

In another example, the recipient entity that subscribes to the service may be an entertainment entity that obtains content from one or more other source entities. For example, the entertainment entity may be a broadcasting entity and the one or more other source entities may be content providers. The metadata associated with a webpage of the one or more other source entities may be updated. For example, a new movie may be available, a new review may be available, etc. The method may then update the metadata associated with the webpage of the broadcasting entity with similar content. Hence, the metadata of the broadcasting entity is enriched to contain the same metadata available on the webpage of the content providers.

In another example, the recipient entity that subscribes to the service may be a service entity that provides a service to a community. For example, the service entity may provide a service for public safety. The service entity may itself obtain the information for providing the public safety service from another source entity. In turn, the network service provider may provide a service for monitoring the webpages of the other source entities to determine when the metadata of the other source webpages have an update. The service provider may then perform an update to the metadata of the service entity when an update to the metadata of the other source entities is detected. For an illustrative example, in the United States of America, the National Oceanic and Atmospheric Administration (NOAA) maintains a website (e.g., weather.gov) for enabling broadcasters, public safety organizations, etc., to receive weather information. In this example, the application server of the network service provider may determine when the metadata associated with a website of NOAA is updated. The application server may then update the metadata of webpages of websites of broadcasters, public safety organizations, etc., with metadata obtained from the webpages of NOAA. Hence, the metadata of the webpages of the broadcasters and public safety organizations is dynamically enriched.

In one embodiment, the operation of identifying the plurality of webpages comprises comparing descriptions of the plurality of webpages to determine whether the descriptions are the same or significantly similar with respective to a topic or an object of the topic. For example, for each webpage of the plurality of webpages a description of the content (e.g., a topic or an object of the topic) may be provided in a description field associated with the webpage. Then, descriptive texts of the respective description fields may be compared to determine whether the plurality of webpages is describing the same topic or the object of a topic. For instance, suppose the description fields of a first webpage and a second webpage both include terms such as: "financial center," "publishing capital," "Statue of Liberty," "Empire State Building," "United Nation Headquarters," and "Wall Street," then, the topic or an object of the topic will likely be "New York City." Then, the first and second webpages may be identified as webpages across which metadata is to be maintained.

In one embodiment, the operation of identifying the plurality of webpages comprises identifying webpages that are based on data sets that are related to each other. For example, there may be a relationship among data sets used to build the plurality of webpages. The relationship may be provided to an application server of the network service provider as a structure (e.g., a data structure) that describes flow of data among the data sets that are used to build the plurality of webpages. For an illustrative example, suppose data sets A, B, C and D reside on respective database servers A, B, C and D. Suppose data set A is considered a "parent" of data sets B, C and D, e.g., the information contained in data sets B, C and D are subsets of the data extracted or derived from data set A. The application server may be provided with a data structure that shows or tracks that data sets B, C and D are all based on data set A. Updating the content of data set A may update the contents of data sets B, C and D. Suppose a first webpage is built based on data set A which resides on the database server A and a second webpage is built based on data set B which resides on the dataset server B. Note that the first and the second webpages are built independently. As such, updating the first webpage does not necessarily update the second webpage.

Once the operation of identifying the plurality of webpages is performed, the method of the present disclosure determines whether any of the plurality of webpages is similar. In one embodiment, the determining of whether any of the plurality of webpages is similar may be performed via a pairwise comparison of the webpages. For example, the method may determine, for each pair of webpages of the plurality of webpages, whether the pair of webpages is similar. For instance, suppose there are four webpages that are identified as members of the plurality of webpages. There are six distinct pairings of the webpages that may be formulated. Then, six pair wise comparisons are made to determine, for each pair, if the "paired" webpages are similar. Note that the pairwise comparison described herein is not intended to limit the implementation. The comparison to identify similarities of webpages may be made among any number of webpages, e.g., two or more.

In one embodiment, the determining if any of the plurality of webpages is similar is performed by determining a textual similarity among the plurality of webpages. In one embodiment, the operation of determining the textual similarity may be based on a predetermined percentage of textual content (broadly a threshold) being common to webpages that are being compared for assessing their textual similarity. For an illustrative example, when 75% or greater of the words (i.e., textual content) are common to two webpages that are being compared, then these two webpages are deemed to be similar. However, it should be noted that this threshold of 75% is only an example and should not be deemed to be a limitation of the present disclosure, e.g., the threshold can be set to a lower value, e.g., 65% and 70%, or a higher value, e.g., 80%, 85% and so on. In one embodiment, the type of webpages may require different thresholds, e.g., webpages related to safety matters may require higher threshold values, whereas webpages related to entertainment matters may require lower threshold values.

In one embodiment, the determining if any of the plurality of webpages is similar is performed by determining a structural similarity among the plurality of webpages. The operation of determining the structural similarity may be based on a comparison of a structure for grouping content associated with a webpage against a structure for grouping content associated with another webpage. In other words, the structure of a particular webpage can be indicated by the manner in which content is grouped (e.g., the information that is grouped or gathered into a particular webpage) and/or is presented (e.g., the way or sequence of the gathered information is organized and presented on the webpage). The structure of a particular webpage may then be compared against structures of other webpages.

In one embodiment, the structure for grouping content associated with a particular webpage of the plurality of webpages comprises one or more of: sections of the particular webpage, subsections of the particular webpage, an ordering of the sections of the particular webpage, an ordering of the subsections of the particular webpage, a structure (e.g., a map or a tree like data structure) for relating the sections of the particular webpage, and a structure for relating the subsections of the particular webpage. The sections and/or subsections may be grouped based on topic, timeline, section number, and so on.

In one embodiment, the structure for grouping content associated with a webpage may comprise a grouping that is based on a list of attributes of the particular webpage. Each attribute of the list of attributes has a term that is assigned, which can be implemented using alphanumeric characters. For example, if the attribute is a name, then the term may be a specific name, e.g., John Doe. In addition, each attribute may be provided in a designated location of the webpage. For example, the list of attributes may be provided in a box for information (i.e., infobox) associated with the webpage. Suppose the list of attributes provided in an infobox associated with the webpage comprise: a date of birth, a place of birth, a name of a mother, a name of a father, etc. The terms of the attributes for a specific person may then be the date of birth of the specific person, the place of birth of the specific person, the name of the mother of the specific person, the name of the father of the specific person, etc.

The structural similarity of a pair of webpages based on a list of attributes may then be performed by comparing the list of attributes associated with the pair of webpages, and the order in which the attributes in the respective list of attributes are organized. In other words, the ordering of the attributes within a list of attributes of a particular webpage may be compared against the ordering of the attributes within a list of attributes of another webpage.

It is noted that the structural similarity, described above, may be used for providing context for understanding the textual similarity among the plurality of webpages. For an illustrative example, suppose a comparison of words on two webpages indicates that 80% of the words on the two webpages are common to both webpages. The method may then determine that the two webpages are textually similar. Suppose a structural comparison of the two webpages indicates that the webpages contain three sections and the sections are titled: "Museum," "Facts," and "Address." The method may determine that the two webpages are structurally similar. Suppose also an analysis of the content indicates that the section titled "Address" includes a list of five digit numbers. Then, the analysis may provide a context for understanding what is represented by the five digit numbers, e.g., zip codes. In other words, the structure of a webpage may provide a context for understanding the textual content of the webpage.

The method of the present disclosure performs the enrichment of metadata of a particular webpage by determining when a metadata associated with another webpage which is similar (i.e., textually or structurally similar) to the particular webpage is updated. The update may be performed to change a textual content of the webpage (e.g., changing a description field) and/or to change a structure of the webpage (e.g., changing how the sections, subsections, and attributes are related, or changing the orders of the sections, subsections, and attributes as to their presentation, and the like). As such, once the operation of determining whether any of the plurality of webpages is similar has been completed, the method may monitor the metadata associated with each webpage of the plurality of webpages that is deemed to be similar to another webpage.

For a webpage of the plurality of webpages, the method determines whether a change to the metadata associated with the webpage of the plurality of webpages is detected. If no change to the metadata associated with the webpage of the plurality of webpages is detected, the method continues the monitoring of the metadata of the webpage.

For a particular webpage that is determined as being similar to the webpage for which the change to the metadata is detected, if the change to the metadata associated with the webpage of the plurality of webpages is detected, the method determines whether the change to the metadata associated with the webpage of the plurality of webpages invokes an update to a metadata associated with the particular webpage. For example, suppose webpages N and M are textually and structurally similar. Then, when a change is detected for the metadata associated with webpage N, the method determines whether the detected change should invoke an update to the metadata associated with webpage M. If the change to the metadata associated with the webpage of the plurality of webpages does not invoke an update to a metadata associated with the particular webpage, then the method continues the monitoring. Otherwise, the method processes the update of the metadata associated with the particular webpage.

In one embodiment, the operation of processing the update of the metadata associated with the particular webpage may comprise: determining whether the metadata of the particular webpage is preauthorized to be updated, determining a rule for the updating the metadata of the particular webpage, when the metadata of the particular webpage is preauthorized to be updated, and updating the metadata of the particular webpage that is preauthorized to be updated in accordance with the rule for the updating the metadata of the particular webpage.

In one embodiment, the rule for the updating the metadata of the particular webpage is received from a subscriber associated with the particular webpage. For example, the service provided by the network service provider may include a feature for dynamically updating the metadata associated with the webpage of the subscriber. Thus, the subscriber may provide, to the network service provider, a preauthorization for updating the metadata associated with the webpage of the subscriber and the pertinent rules for performing the updating of the metadata associated with the webpage of the subscriber. In one example, a rule received from the subscriber may stipulate accepting updates only from a specific list of webpages from among the webpages that are determined as being similar to the webpage of the subscriber. In another example, the rule received from the subscriber may stipulate accepting updates only for a structural change. In yet another example, the rule received from the subscriber may stipulate accepting updates for adding content but not for deleting content, and so on. These illustrative examples of rules for updating metadata as dictated by the subscriber should not be interpreted as limitations of the present disclosure.

In one embodiment, the operation of processing the update of the metadata associated with the particular webpage may comprise: determining whether the metadata of the particular webpage is preauthorized to be updated, determining a rule for generating a recommendation for the updating the metadata of the particular webpage, when the metadata of the particular webpage is not preauthorized to be updated, and providing the recommendation that is generated to a server of the particular webpage. A user or a predefined method may then interact with the server of the particular webpage to either accept or reject the recommendation. For example, a subject matter expert (SME) may accept or reject via an input/output interface. The method then receives an indication from the server indicating whether the recommendation is accepted.

In one embodiment, the operation of processing the update of the metadata associated with the particular webpage is for modifying a textual content of the particular webpage. In one embodiment, the modifying of the textual content of the particular webpage may comprise one or more of: adding a new textual content to the particular webpage, deleting an existing textual content from the particular webpage, and altering an existing textual content (e.g., by editing textual content) of the particular webpage.

In one embodiment, the operation of processing the update of the metadata associated with the particular webpage is for modifying a structure of the particular webpage. In one embodiment, the modifying of the structure of the particular webpage may comprise one or more of: adding a new section to the particular webpage, adding a new subsection to the particular webpage, removing an existing section from the particular webpage, removing an existing subsection from the particular webpage, combining a plurality of existing sections of the particular webpage, combining a plurality of existing subsections of the particular webpage, modifying an ordering of a plurality of sections of the particular webpage, and modifying an ordering of a plurality of subsections of the particular webpage. In one embodiment, the modifying of the structure of the particular webpage may comprise one or more of: adding a new attribute to a list of attributes of the particular webpage, removing an existing attribute from the list of attributes of the particular webpage, combining a plurality of existing attributes in the list of attributes of the particular webpage, and modifying an ordering of a plurality of attributes in the list of attributes of the particular webpage.

In one embodiment, once the operation of processing the update of the metadata associated with the particular webpage is completed, the method may determine, for the particular webpage, whether the rule for generating the recommendation or the rule for the updating the metadata is to be modified. In other words, the rule itself can be the subject of an update. If the rule for generating the recommendation or the rule for the updating is to be modified, the method modifies the respective rule for generating the recommendation or the rule for the updating. For example, if the response from the server indicates that a recommendation was rejected, then the method may modify one or more rules that were responsible for making the recommendation, to avoid making the same recommendation in the future. However, if the response from the server indicates that a recommendation was accepted, then the likelihood of a similar recommendation being accepted in the future is increased. In turn, the method for making the recommendation may learn from the interaction with the server. In other words, the indication received from the server of the particular webpage may be used for refining the steps of generating and providing the recommendations (i.e., future recommendations) to the server of the particular webpage. Said another way, the method for making the recommendation (e.g., the rules) can be dynamically trained using machine learning techniques responsive to how recommendations are treated.

FIG. 1 illustrates an example network 100 related to the present disclosure. In one illustrative embodiment, the network 100 comprises an access network 101, a core network 103, a server 125 of an entity A, a server 126 of an entity B, a server 127 of an entity C, and a server 128 of an entity D.

The access network 101 may comprise a Wireless-Fidelity (Wi-Fi) network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Each server of the servers 125-128 has a respective website built based on data stored in a database associated with the server. For example, webpage 135 is a webpage of a website of entity A that is built based on data stored in a database 145 which is a database associated with server 125. Webpage 136 is a webpage of a website of entity B that is built based on data stored in a database 146 which is a database associated with server 126. Webpage 137 is a webpage of a website of entity C that is built based on data stored in a database 147 which is a database associated with server 127. Webpage 138 is a webpage of a website of entity D that is built based on data stored in a database 148 which is a database associated with server 128.

Figure 4:
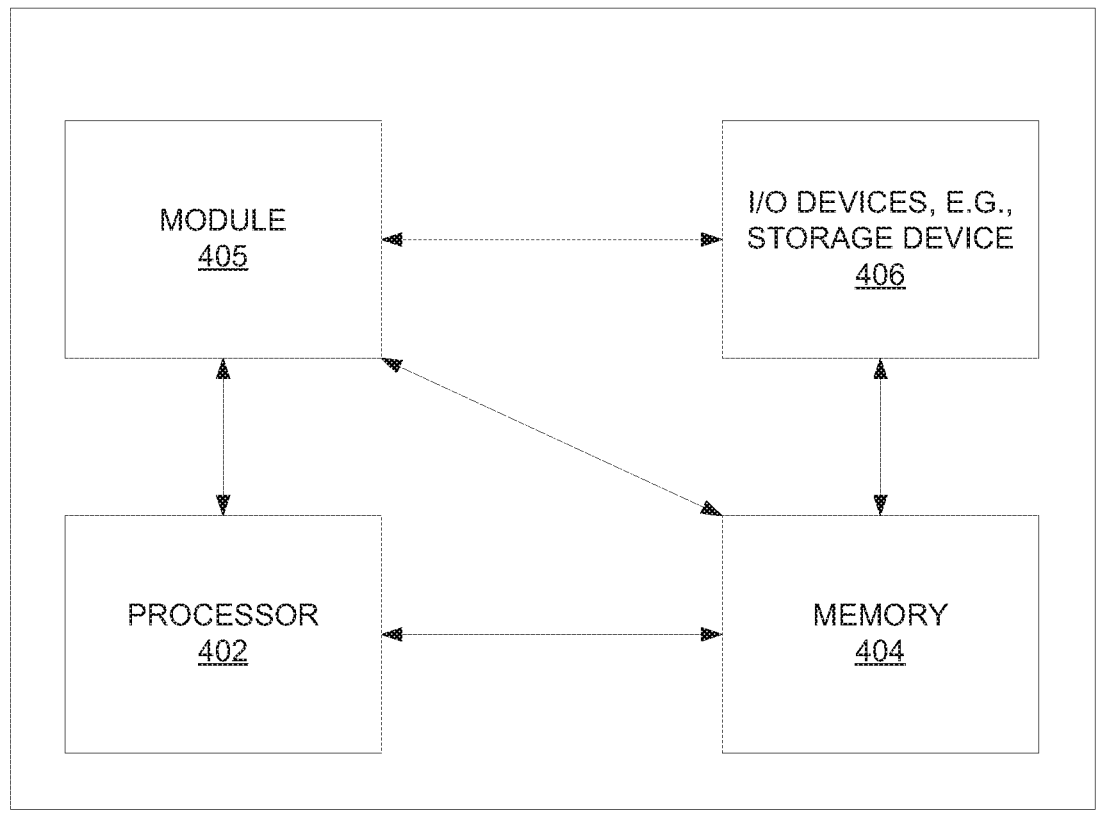
FIG. 4 depicts a high-level block diagram of a computer suitable for use in performing the functions described herein.

In one embodiment, the core network 103 may include an Application Server (AS) 104 and a database server 106. In one embodiment, the AS 104 is configured to perform the methods and functions described herein (e.g., the method 200 discussed below). For example, the AS 104 may be deployed as a hardware device embodied as a dedicated server (e.g., the dedicated computer 400 as illustrated in FIG. 4). In other words, the AS 104 is for enriching metadata in accordance with the teachings of the present disclosure. The application server 104 may comprise an analytical engine 105. The application server 104 may be communicatively coupled with the database server 106. In one embodiment, each server of the servers 125-128 may communicate with the application server 104 via the access network 101.

In one embodiment, the database server 106 may be used for storing data gathered from various webpages and subscribers. For example, metadata gathered from webpages of entities A-D, subscriber data for providing the service for enriching metadata, rules for generating and providing recommendations, rules for updating metadata of webpages associated with subscribers, etc., may be stored in the database server 106. The application server 104 may then access the database when providing the service for the enrichment of metadata.

It should be noted that the network 100 may include additional networks and/or elements that are not shown to simplify FIG. 1. For example, the access network and the core network of FIG. 1 may include additional network elements (not shown), such as for example, base stations, border elements, gateways, firewalls, routers, switches, call control elements, various application servers, and the like.

Although a single database is shown in core network 103 of FIG. 1, the various types of data may be stored in any number of databases. For instance, various databases, e.g., a database for subscriber information, a database for rules, a database for a list of webpages across which properties are to be maintained, a database for which webpages are textually similar, a database for which webpages are structurally similar, a database for webpages with preauthorized updates of metadata, a database for historical data in regards to accepted and rejected recommendations, etc., may be used. In addition, the various types of data may be stored in a cloud storage. In other words, the network service provider may implement the service for providing enrichment of metadata of the present disclosure by utilizing distributed storing of data in a cloud storage and/or a centralized server.

In one embodiment, the AS 104 is used for implementing the present method for providing a service for enriching metadata associated with a webpage. The AS 104 of the present disclosure is for determining whether any of a plurality of webpages is similar, monitoring metadata associated with each webpage of the plurality of webpages, determining, for a webpage of the plurality of webpages, if a change to the metadata associated with the webpage is detected, determining, for a particular webpage that is determined as being similar to the webpage for which the change to the metadata is detected, whether the change to the metadata associated with the webpage invokes an update to a metadata associated with the particular webpage, when the change to the metadata associated with the webpage is detected, and processing the update of the metadata associated with the particular webpage when the change to the metadata associated with the webpage invokes the update to the metadata associated with the particular webpage.

Figure 2:
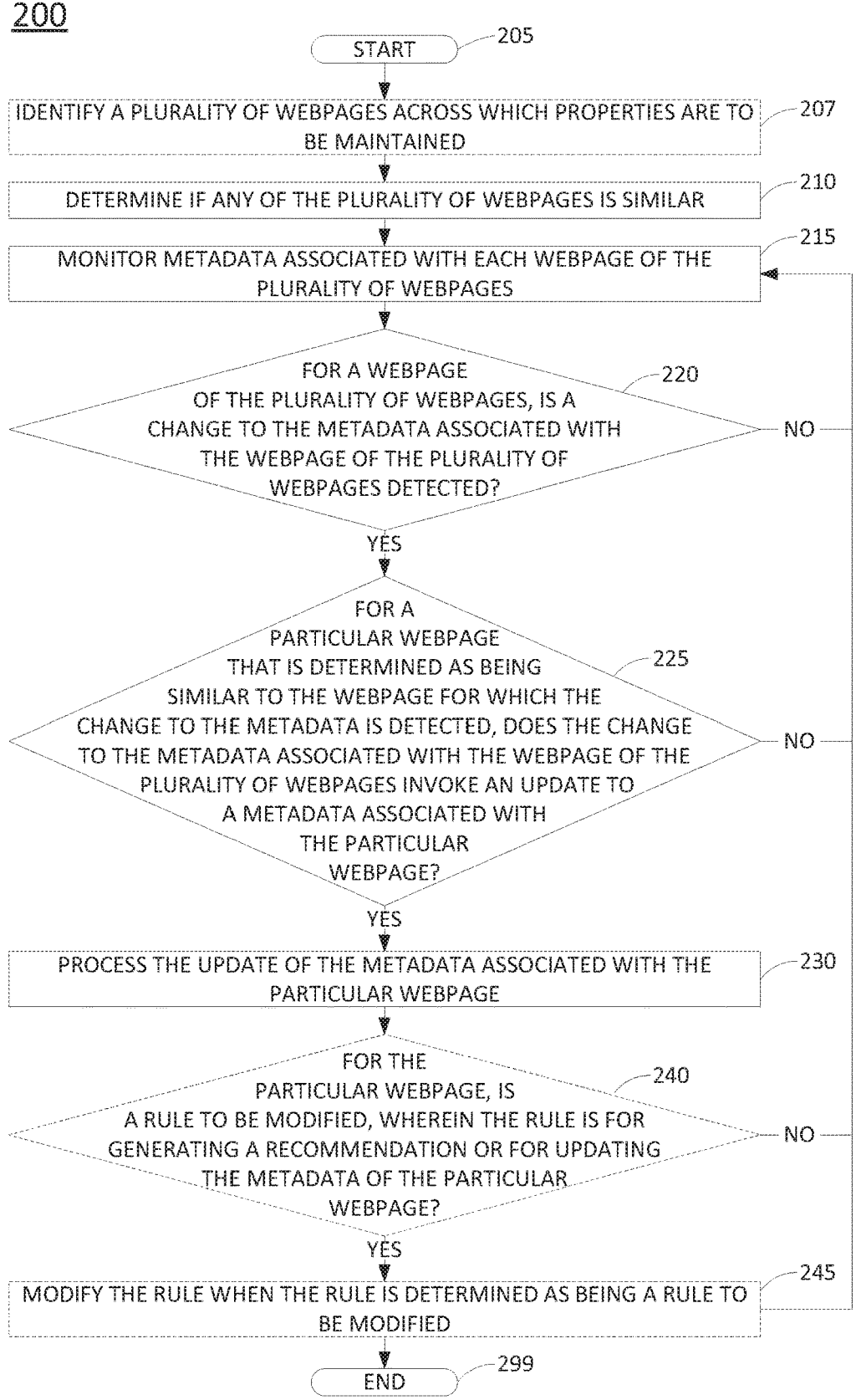
FIG. 2 illustrates a flowchart of an example method for enriching metadata.

FIG. 2 illustrates a flowchart of an example method 200 for enriching metadata in accordance with the present disclosure. In one embodiment, the method 200 may be implemented in an application server, e.g., an application server 104, or the processor 402 as described in FIG. 4. The method 200 starts in step 205 and proceeds to step 207.

In optional step 207, the processor identifies a plurality of webpages across which properties are to be maintained, e.g., maintained in a consistent manner between similar webpages. For example, the plurality of webpages that may have similar content and/or structure are identified and in turn, any changes detected in similar webpages are consistently proliferated across these similar webpages. In one embodiment, step 207 may be omitted if the subscriber provides a list of similar or related webpages.

In step 210, the processor determines whether any of the plurality of webpages is similar. For example, the plurality of webpages may be textually and/or structurally similar. In other words, if two or more webpages are deemed to be similar, the processor will also note how these webpages are similar as to their textual content and/or structure.

In step 215, the processor monitors the metadata associated with each webpage of the plurality of webpages that is deemed to be similar with another webpage. For example, each webpage of the plurality of webpages is monitored such that a change to a metadata associated with any of the plurality of webpages is detected.

In step 220, the processor, for a webpage (broadly a first webpage) of the plurality of webpages, determines whether a change to the metadata associated with the webpage of the plurality of webpages is detected. If no change to the metadata associated with the webpage of the plurality of webpages is detected, the processor returns to step 215. Otherwise, the processor proceeds to step 225.

In step 225, the processor, for a particular webpage (broadly a second webpage) that is determined as being similar to the webpage (broadly the first webpage) for which the change to the metadata is detected, the method determines whether the change to the metadata associated with the webpage of the plurality of webpages invokes an update to a metadata associated with the particular webpage. If the change to the metadata associated with the webpage of the plurality of webpages invokes the update to the metadata associated with the particular webpage, the processor proceeds to step 230. Otherwise, the processor returns to step 215.

Figure 3:
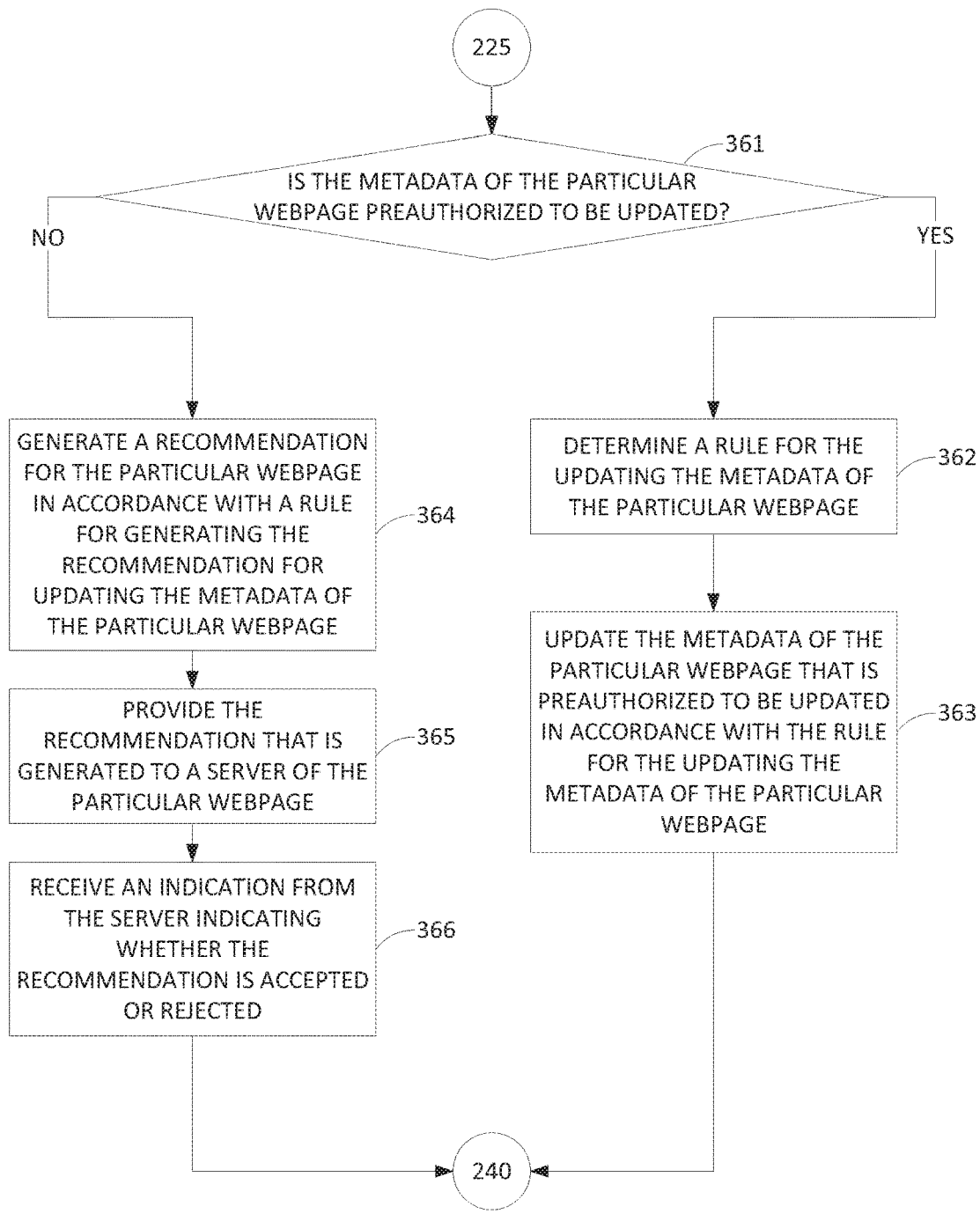
FIG. 3 illustrates a flowchart of an example method for processing an update for a metadata associate with a webpage.

In step 230, the processor, processes the update of the metadata associated with the particular webpage. FIG. 3 illustrates a flowchart of an example method for processing the update for the metadata associated with the particular webpage. In other words, FIG. 3 (described below) is a detailed flowchart for performing the updating step 230. For example, the processor performs either the updating the metadata of the particular webpage when the updating is preauthorized or providing a recommendation to a server of the particular webpage, where the recommendation may be accepted or rejected.

In optional step 240, the processor, determines, for the particular webpage, whether a rule for generating a recommendation or a rule for updating the metadata of the particular webpage is to be modified. If the rule for generating the recommendation or the rule for the updating the metadata of the particular webpage is deemed necessary to be modified, the processor proceeds to step 245. Otherwise, the processor returns to step 215. For example, the processor may receive feedback from the subscriber as to the action taken in step 230, e.g., positively or negatively. Using machine learning technique (e.g., neural network learning techniques), the method may then decide whether to update the model or the set of rules that was used to perform the action of step 230. For example, a positive feedback will likely further re-enforce (e.g., strengthened) the set of rules that was used to undertake the action of step 230, whereas a negative feedback will likely de-emphasized (e.g., weakened) the set of rules that was used to undertake the action of step 230.

In optional step 245, the processor modifies the rule when the rule is determined as being a rule needed to be modified. The processor either proceeds to step 215 to continue monitoring or proceeds to step 299 to end the process.

As described above, FIG. 3 illustrates a flowchart of an example method for processing an update for a metadata associate with a webpage. In one embodiment, step 230 for processing the update of the metadata associated with the particular webpage may comprise: a step 361 for determining whether the metadata of the particular webpage is preauthorized to be updated, a step 362 for determining a rule for the updating the metadata of the particular webpage, when the metadata of the particular webpage is preauthorized to be updated, and a step 363 for updating the metadata of the particular webpage that is preauthorized to be updated in accordance with the rule for the updating the metadata of the particular webpage.

In one embodiment, step 230 for processing the update of the metadata associated with the particular webpage may comprise: a step 364 for generating a recommendation for the particular webpage in accordance with a rule for generating the recommendation for updating the metadata of the particular webpage, when the metadata of the particular webpage is not preauthorized to be updated, a step 365 for providing the recommendation that is generated to a server of the particular webpage, and a step 366 for receiving an indication from the server indicating whether the recommendation is accepted or rejected.

Returning to the illustrative example described above, recall that data sets A, B, C and D reside on respective database servers A, B, C and D and data set A is a parent of data sets B, C and D. Various scenarios for data sets A-D are described below. However, the scenarios described herein are examples and are not intended to comprise all possible scenarios for enriching metadata.

In one example, suppose data set A contains a data component 1. For example, data component 1 may be a list of phone numbers. Suppose the list of phone numbers propagates to data set B. Then, data set A is considered to be a "parent" of data set B, since the data component 1 is also contained in data set B. As such, the metadata about data component 1 as to data set A will be similar to the metadata about data component 1 in data set B.

In one scenario, suppose the method of the application server recognizes updates to change the description of data component 1 in data set A. For example, in step 220, the processor of the application server determines that a change to the metadata associated with the webpage of data set A is detected. Then, the processor of the application server determines whether the change to the metadata associated with the webpage of data set A will also invoke an update to a metadata associated with the webpage of data set B. If the change to the metadata associated with the webpage of data set A does invoke the update to the metadata associated with the webpage of data set B, the processor of the application server will process the update of the metadata associated with the webpage of data set B. In one embodiment, the processing of the update is for providing a recommendation to change the description of data component 1 in data set B to match the description of data component 1 in data set A.

In another scenario, suppose the method of the application server recognizes that a new section is added to a description of data set A with a new set of attributes. The method may recommend that a new section also be added to the description of data set B with the same new set of attributes as those of data set A.

In another scenario, suppose the method of the application server recognizes that new attributes are added to the description of data set B. The method may recommend adding the new attributes to the descriptions of data sets A and C. Suppose now the recommendation to add the new attributes to the description of data set C is accepted but the recommendation to add the new attributes to the description of data set A is rejected. The method of the application server may be refined to recognize that the recommended suggestion was valid for siblings of data set B but not for the parent of data set B. In the future, recommendations of the same type may be made among data sets that have a "sibling" relationship. However, the recommendation of the same type may not be made for a data set that is a parent of the data set for which the new attributes are added.

In another scenario, suppose the method of the application server recognizes that an inventory process added a new metadata for quality information. For example, suppose the new metadata causes an attribute for a quality index to be added to descriptions of all objects in a data set A. Since data set A is the parent of data sets B, C and D, the processor may add a placeholder for the same attribute, i.e., the quality index, to all downstream data sets B, C and D. For ease of understanding, suppose then the method recognized the following events sequentially (as described below in several additional scenarios).

In another scenario, suppose the method recognizes that an automated process populated values of the quality index (i.e., the new attribute added in the above scenario) based on values obtained from an inventory system. Then, the processor may recommend adding the same values to the quality indices of data sets B, C and D. Suppose the values of the quality indices of data sets B and C are accepted, and the values of the quality index of data set D are subsequently rejected. In turn, the method will recognize that the recommendation to add the values was accepted for data sets B and C but rejected for data set D. The method will keep a record of the non-acceptance of quality index values such that recommendations in the future may be refined as to data set D.

In another scenario, suppose the method recognizes that a textual description is added for the quality index of data set B. The processor may then suggest that the textual description is also to be added to the quality indices of data sets A and C. Since the values of the quality index for data set D were previously rejected, the processor may not recommend adding the textual description for data set D. That is, the record of non-acceptance is used for skipping the recommendation to add the textual description for the data set D.

In another scenario, suppose the method recognizes that the recommendation to add the textual description is accepted for data set C but rejected for data set A. The method will keep a record of the non-acceptance of the textual description of the quality index. Thus, the method will store the rejection or acceptance decisions for each of the data sets along with the information as to the relationship (e.g., parent, child or sibling relationship). For example, the parent (data set A) rejected the recommendation but the sibling (data set C) accepted the recommendation.

In addition, although not specifically specified, one or more steps, functions or operations of method 200 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Moreover, steps, blocks, functions or operations of the above described method 200 can be combined, separated, and/or performed in a different order from that described above, without departing from the example embodiments of the present disclosure.

As such, the present disclosure provides at least one advancement in the technical field of enriching the metadata of webpages. For instance, in one example, the present disclosure provides a server of a network service provider that provides a service for enrichment of metadata of webpages of subscribers. The server of the network service provider provides the service in accordance with rules for either performing the updating the metadata or for providing a recommendation for updating the metadata. The server may also receive an indication as to whether the recommendation is accepted. As such, the recommendations that were provided previously may be used for fine-tuning the process of providing future recommendations.

FIG. 4 depicts a high-level block diagram of a computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for enriching metadata, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or each of the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 405 for enriching metadata (e.g., a software program comprising computer-executable instructions) can be loaded into memory 404 and executed by hardware processor element 402 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for enriching metadata (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
    subscribing, by a processor of a server, to a service for enriching metadata with a network service provider of a communications network;
    receiving, by the processor, a recommendation for an update to metadata associated with a first webpage, wherein the recommendation is received from the network service provider, wherein the recommendation is generated by the network service provider by:
        monitoring metadata associated with a second webpage of a plurality of webpages, the second webpage having been determined to be similar to the first webpage of the plurality of webpages;
        detecting a change to the metadata associated with the second webpage;
        determining whether the change to the metadata associated with the second webpage invokes an update to the metadata associated with the first webpage; and
        generating the recommendation when the change invokes the update to the metadata associated with the first webpage; and
    providing, by the processor, an indication to the network service provider indicating whether the recommendation is accepted or rejected.

2. The method of claim 1, wherein the first webpage is identified to the network service provider in accordance with the service for enriching metadata.

3. The method of claim 1, wherein the providing the indication to the network service provider comprises:
determining whether the metadata of the first webpage is preauthorized to be updated by the network service provider.

4. The method of claim 3, wherein the providing the indication to the network service provider further comprises:
determining a rule for updating the metadata of the first webpage, when the metadata of the first webpage is preauthorized to be updated; and
providing the rule for updating the metadata of the first webpage when the metadata of the first webpage is determined to be preauthorized to be updated by the network service provider.

5. The method of claim 1, wherein the first webpage is determined to be similar to the second webpage via a pairwise comparison of the first webpage and the second webpage.

6. The method of claim 5, wherein the pairwise comparison is performed by determining a textual similarity between the first webpage and the second webpage.

7. The method of claim 5, wherein the pairwise comparison is performed by determining a structural similarity between the first webpage and the second webpage.

8. The method of claim 7, wherein the determining the structural similarity is based on a comparison of a structure for grouping content associated with the first webpage against a structure for grouping content associated with the second webpage.

9. The method of claim 8, wherein the structure for grouping content associated with the first webpage and the second webpage comprises one or more of: sections of a webpage, subsections of a webpage, an ordering of the sections, an ordering of the subsections, a structure for relating the sections, or a structure for relating the subsections.

10. The method of claim 8, wherein the structure for grouping content associated with the first webpage and the second webpage comprises a grouping that is based on a list of attributes of a webpage.

11. The method of claim 1, wherein the update of the metadata associated with the first webpage is for modifying a textual content of the first webpage.

12. The method of claim 11, wherein the modifying the textual content of the first webpage comprises one or more of: adding a new textual content to the first webpage, deleting an existing textual content from the first webpage, or altering an existing textual content of the first webpage.

13. The method of claim 1, wherein the update of the metadata associated with the first webpage comprises modifying a structure of the first webpage.

14. A non-transitory computer-readable storage device storing a plurality of instructions which, when executed by a processor of a server, cause the processor to perform operations, the operations comprising:
subscribing to a service for enriching metadata with a network service provider of a communications network;
receiving a recommendation for an update to metadata associated with a first webpage, wherein the recommendation is received from the network service provider, wherein the recommendation is generated by the network service provider by:
monitoring metadata associated with a second webpage of a plurality of webpages, the second webpage having been determined to be similar to the first webpage of the plurality of webpages;
detecting a change to the metadata associated with the second webpage;
determining whether the change to the metadata associated with the second webpage invokes an update to the metadata associated with the first webpage; and
generating the recommendation when the change invokes the update to the metadata associated with the first webpage; and
providing an indication to the network service provider indicating whether the recommendation is accepted or rejected.

15. The non-transitory computer-readable storage device non-transitory computer-readable storage device of claim 14, wherein the providing the indication to the network service provider comprises:
determining whether the metadata of the first webpage is preauthorized to be updated by the network service provider.

16. The non-transitory computer-readable storage device of claim 15, wherein the providing the indication to the network service provider further comprises:
determining a rule for updating the metadata of the first webpage, when the metadata of the first webpage is preauthorized to be updated; and
providing the rule for updating the metadata of the first webpage when the metadata of the first webpage is determined to be preauthorized to be updated by the network service provider.

17. The non-transitory computer-readable storage device of claim 14, wherein the update of the metadata associated with the first webpage is for modifying a textual content of the first webpage.

18. An apparatus comprising:
a processor of a server; and
a computer-readable storage device storing a plurality of instructions which, when executed by the processor, cause the processor to perform operations, the operations comprising:
subscribing to a service for enriching metadata with a network service provider of a communications network;
receiving a recommendation for an update to metadata associated with a first webpage, wherein the recommendation is received from the network service provider, wherein the recommendation is generated by the network service provider by:
monitoring metadata associated with a second webpage of a plurality of webpages, the second webpage having been determined to be similar to the first webpage of the plurality of webpages;
detecting a change to the metadata associated with the second webpage;
determining whether the change to the metadata associated with the second webpage invokes an update to the metadata associated with the first webpage; and
generating the recommendation when the change invokes the update to the metadata associated with the first webpage; and
providing an indication to the network service provider indicating whether the recommendation is accepted or rejected.

19. The apparatus of claim 18, wherein the providing the indication to the network service provider comprises:
determining whether the metadata of the first webpage is preauthorized to be updated by the network service provider.

20. The apparatus of claim 19, wherein the providing the indication to the network service provider further comprises:
  determining a rule for updating the metadata of the first webpage, when the metadata of the first webpage is preauthorized to be updated; and
  providing the rule for updating the metadata of the first webpage when the metadata of the first webpage is determined to be preauthorized to be updated by the network service provider.

* * * * *